US009001120B2

(12) United States Patent
Steedly et al.

(10) Patent No.: US 9,001,120 B2
(45) Date of Patent: Apr. 7, 2015

(54) USING PHOTO COLLECTIONS FOR THREE DIMENSIONAL MODELING

(71) Applicant: Microsoft Corporation, Redmond, WA (US)

(72) Inventors: Drew Steedly, Redmond, WA (US); Rick Szeliski, Kirkland, WA (US); Sudipta Sinha, Carrboro, NC (US); Maneesh Agrawala, Oakland, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/708,448

(22) Filed: Dec. 7, 2012

(65) Prior Publication Data
US 2013/0100128 A1    Apr. 25, 2013

Related U.S. Application Data

(63) Continuation of application No. 12/059,794, filed on Mar. 31, 2008, now Pat. No. 8,350,850.

(51) Int. Cl.
*G06T 15/00* (2011.01)
*G06T 17/00* (2006.01)
*G06T 7/00* (2006.01)
*G06T 15/20* (2011.01)

(52) U.S. Cl.
CPC ............... *G06T 17/00* (2013.01); *G06T 7/0061* (2013.01); *G06T 7/0067* (2013.01); *G06T 15/205* (2013.01); *G06T 2200/08* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 6,912,293 B1* | 6/2005 | Korobkin | 382/100 |
| 2003/0067462 A1* | 4/2003 | Fujiwara | 345/420 |
| 2005/0219264 A1* | 10/2005 | Shum et al. | 345/629 |

OTHER PUBLICATIONS

Paul E. Debevec, Camillo J. Taylor, and Jitendra Malik. 1996. Modeling and rendering architecture from photographs: a hybrid geometry- and image-based approach. In Proceedings of the 23rd annual conference on Computer graphics and interactive techniques (SIGGRAPH '96). ACM, New York, NY, USA, 11-20.*
Fruh, C.; Zakhor, A., "Constructing 3D city models by merging ground-based and airborne views," Computer Vision and Pattern Recognition, 2003. Proceedings. 2003 IEEE Computer Society Conference on , vol. 2, Jun. 2003.*

(Continued)

*Primary Examiner* — Daniel Hajnik
(74) *Attorney, Agent, or Firm* — Sandy Swain; Judy Yee; Micky Minhas

(57) ABSTRACT

A collection of photos and a three-dimensional reconstruction of the photos are used to construct and texture a mesh model. In one embodiment, a first digital image of a first view of a real world scene is analyzed to identify lines in the first view. Among the lines, parallel lines are identified. A three-dimensional vanishing direction in a three-dimensional space is determined based on the parallel lines and an orientation of the digital image in the three-dimensional space. A plane is automatically generated by fitting the plane to the vanishing direction. A rendering of a three-dimensional model with the plane is displayed. Three-dimensional points corresponding to features common to the photos may be used to constrain the plane. The photos may be projected onto the model to provide visual feedback when editing the plane. Furthermore, the photos may be used to texture the model.

17 Claims, 11 Drawing Sheets

(56) References Cited

OTHER PUBLICATIONS

Frohlich, Bernd, and John Plate. "The cubic mouse: a new device for three-dimensional input." Conference on Human Factors in Computing Systems: Proceedings of the SIGCHI conference on Human factors in computing systems. vol. 1. No. 06. 2000.*

Snavely, Noah, Steven M. Seitz, and Richard Szeliski. "Photo tourism: exploring photo collections in 3D." ACM Transactions on Graphics (TOG). vol. 25. No. 3. ACM, 2006.*

Chopra: NPL Video titled "SketchUp: Modeling with Photo Match" dated Jul. 6, 2007, www.youtube.com/watch?v=fSuDoX8SPtU; Select screenshots included.*

Google SketchUp 6: AECbytes Product Review, Dated Mar. 13, 2007, http://www.aecbytes.com/review/2007/SketchUp6.html.*

Werner, Tomás, and Andrew Zisserman. "New techniques for automated architectural reconstruction from photographs." Computer Vision—ECCV 2002. Springer Berlin Heidelberg, 2002. 541-555.*

Chopra: NPL Video titled "SketchUp: The thing you have to know" dated Jul. 6, 2007, http://www.youtube.com/watch?v=NV0mLPQDcJ4; Select screenshots included.*

* cited by examiner

100

102

104

USING PHOTO COLLECTIONS FOR THREE DIMENSIONAL MODELING

RELATED APPLICATIONS

This application is a Continuation of prior application Ser. No. 12/059,794, filed Mar. 31, 2008. The afore-mentioned application is incorporated herein by reference.

BACKGROUND

Recently it has become possible to take collections of digital photos of a real world subject or scene and algorithmically reconstruct related information in a three-dimensional space. Such reconstructed information may relate to where a camera was situated relative to the subject or scene when a photo was taken, what the focal length of a photo is relative to its three-dimensional camera position, or where feature points of the subject or scene, as derived from the photos, are located in the three-dimensional space.

While this set of information is independently useful, such information has not been leveraged in the area of three-dimensional modeling. In particular, overlapping photos and three-dimensional information reconstructed from them have not been used to help rapidly generate and edit the geometry and texture of a three-dimensional mesh model of the subject or scene.

Techniques related to improved three-dimensional modeling and texturing are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

As discussed below, a collection of photos and a three-dimensional reconstruction of the photos may be used to construct and texture a mesh model. In one embodiment, a first digital image of a first view of a real world scene is analyzed to identify lines in the first view. Among the lines, parallel lines are identified. A three-dimensional vanishing direction in a three-dimensional space is determined based on the parallel lines and an orientation of the digital image in the three-dimensional space. A plane is automatically generated by fitting the plane to the vanishing direction. A rendering of a three-dimensional model with the plane is displayed. Three-dimensional points corresponding to features common to the photos may be used to constrain the plane. The photos may be projected onto the model to provide visual feedback when editing the plane. Furthermore, the photos may be used to texture the model.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to using digital photos of a subject, and three-dimensional information derived from the photos, to facilitate generating and editing the geometry and/or textures of a three-dimensional model of the real world subject in the photos. The following description will begin with discussion of the three-dimensional information, which may include postures (positions and orientations) of virtual cameras corresponding to postures of cameras that took the respective photos, as well as focal distances of the photos relative to their virtual cameras. The three-dimensional information may also include a cloud of three-dimensional points representing reconstructed locations of features of the photographic subject that are common to two or more of the photos. The description will then cover techniques for using this information to build the geometry, including fitting a plane of the model to one or more of the points in the point cloud and/or one or more directions of respective vanishing points derived from a photo. The description will then discuss techniques for constructing textures for the model using the photos and the three-dimensional information thereof.

Synthesis of Photo Collection

Figure 1:
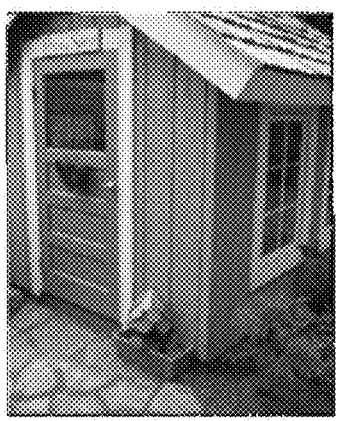
FIG. 1 shows a collection of photos.
Figure 1:
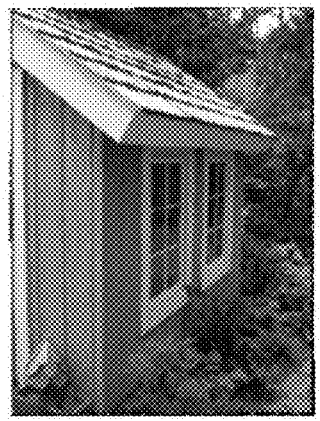
Figure 1:
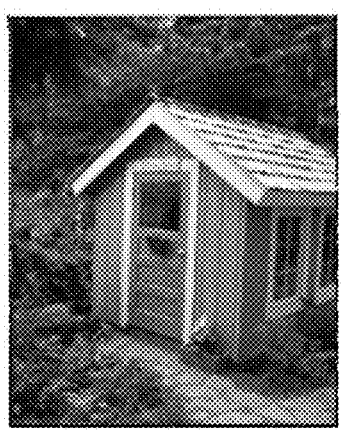
Figure 1:
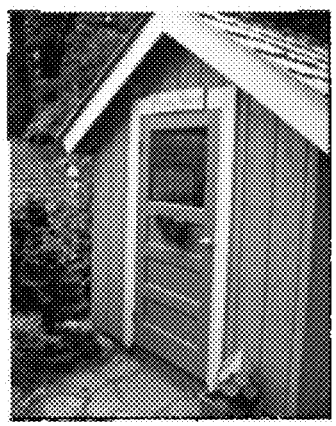

FIG. 1 shows a collection of photos 100. The photos 100 are of a subject or scene, in this case, a shed. The photos 100 were taken from different positions relative to the shed, as seen in the differences between the photos 100. Some of the photos overlap. That is to say, parts of the shed in one photo are also in another photo. For example, overlapping photos 102 and 104 both show portions of a door. The collection of photos 100 may be taken from a same camera or from different cameras. The photos 100 might also be video frames captured from a video camera. Because of the overlap between photos, it is possible to reconstruct some basic three-dimensional information about the photos 100 and the shed.

Figure 2:
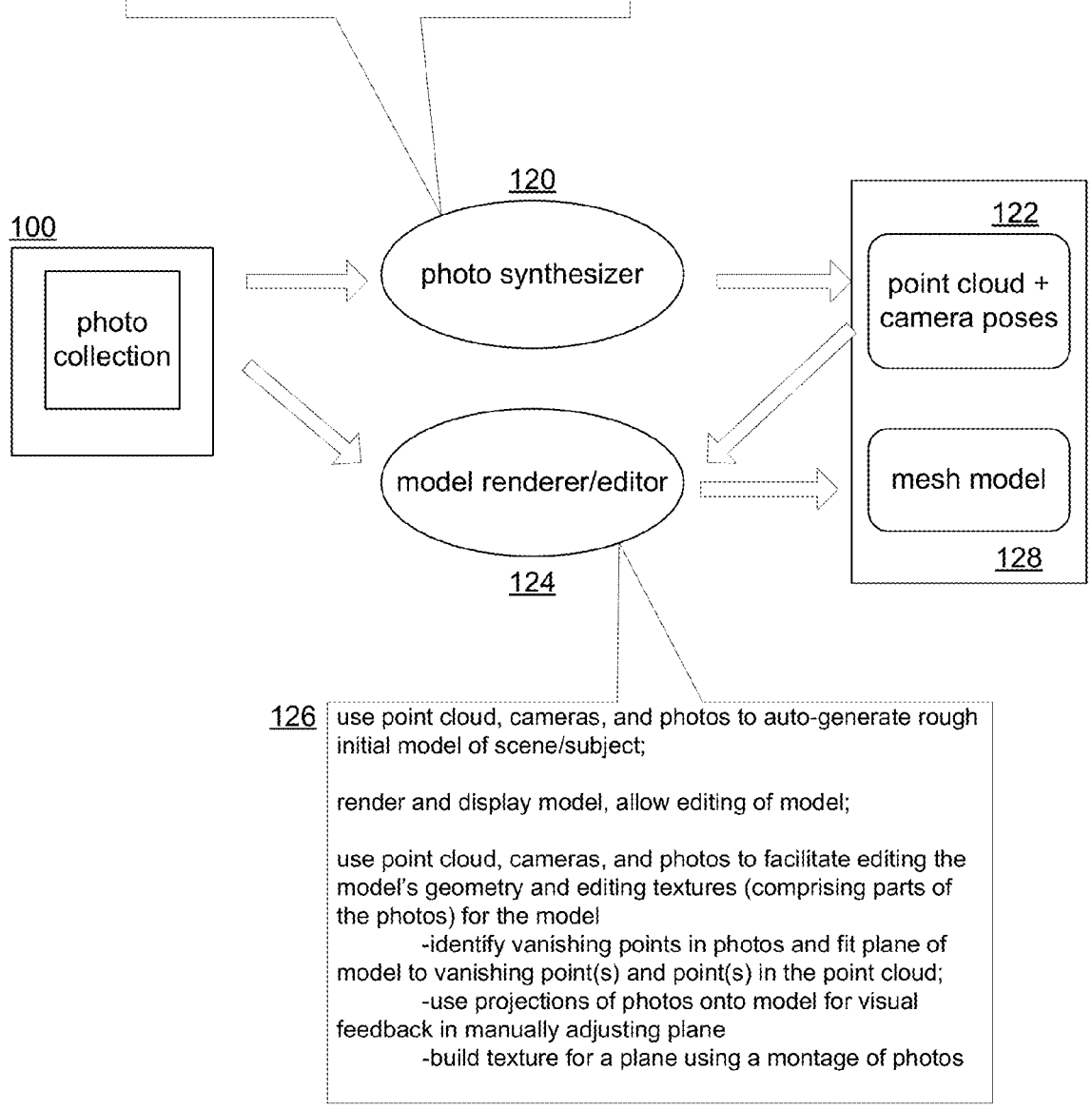
FIG. 2 shows a system for generating a model from a collection of photos.
Figure 3:
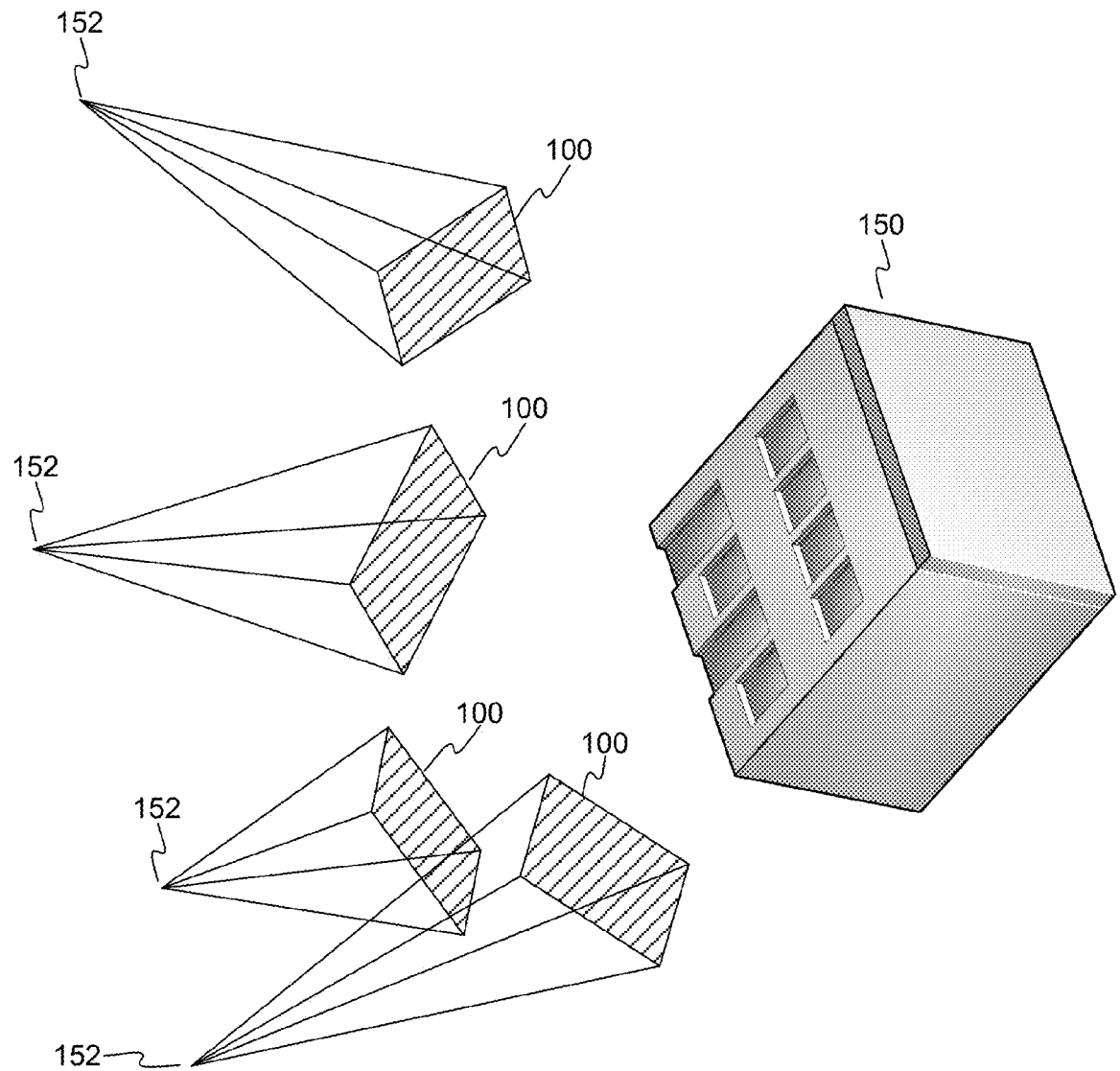
FIG. 3 shows photos and viewpoints of virtual cameras of a real world scene or subject.

FIG. 2 shows a system for generating a model from a collection of photos. The system starts with the collection of photos 100. A photosynthesizer 120 (or synther) performs a process 122 for synthesizing the photos 100 to obtain three-dimensional information about the photos 100. More specifically, the photo synthesizer 120 receives the photos 100 and analyzes the photos to extract features of the real world subject in the photos 100. Features common to overlapping photos are identified. The features common to overlapping photos are used to determine camera postures for respective photos. These will be referred to as viewpoints or virtual cameras, which together are sometimes referred to as a "synth". A photo's virtual camera preferably lies on a line normal to the photo (preferably from the center of the photo) and at a distance known as the focal length. For an example, see FIG. 3, showing a plurality of photos 100 of subject 150 and corresponding reconstructed three-dimensionally arranged virtual cameras 152, which in practice are stored as corresponding data structures or objects in computer memory or storage. More specifically, the photosynthesizer 120 reconstructs the positions and directions from which the photos were captured.

Figure 4:
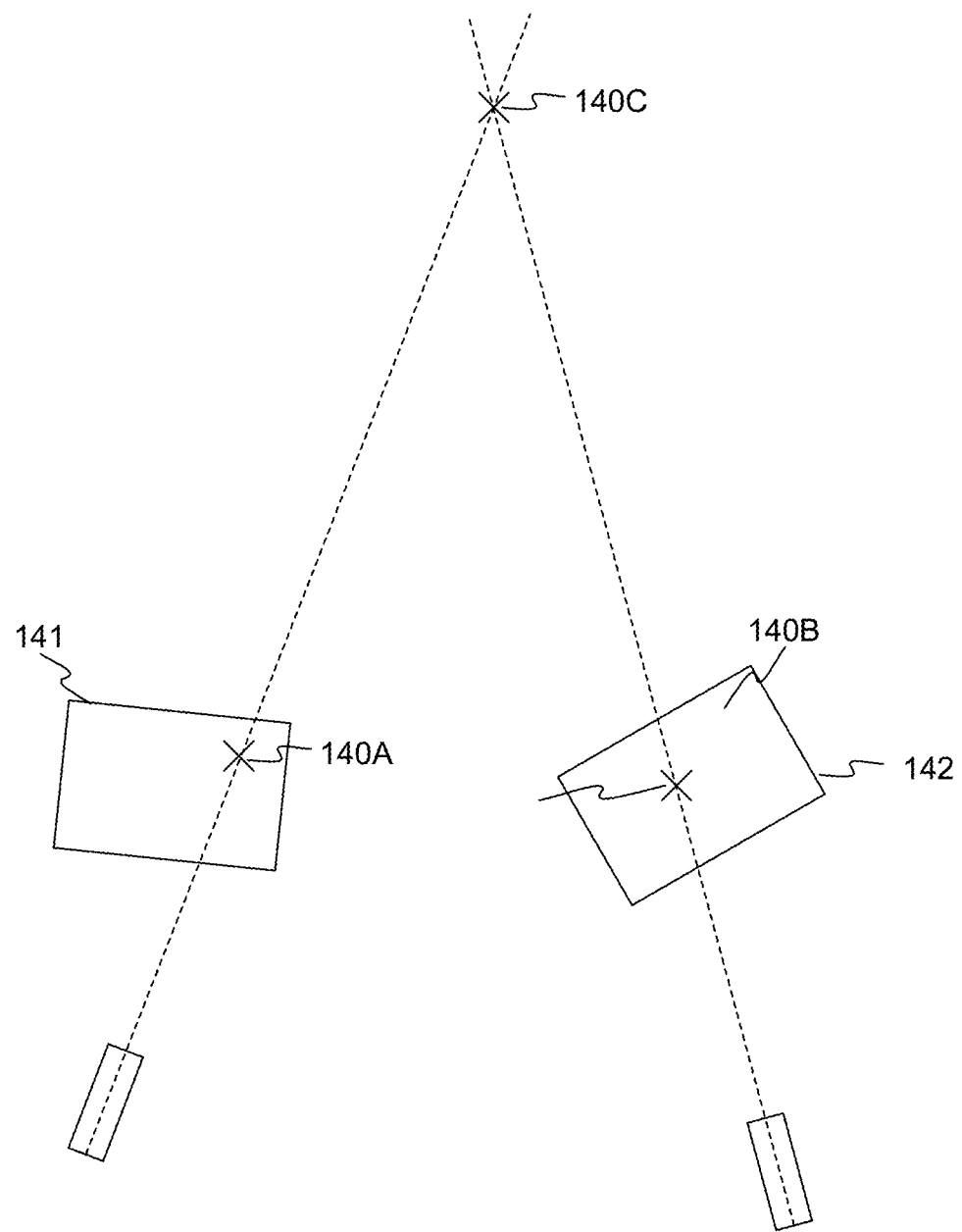
FIG. 4 shows photos sharing a common feature.

The photo synthesizer 120 also determines a sparse point cloud comprised of points in three-dimensional space, where the points are an estimation of the location in three-dimensional space of features of the subject found in the photos. A point may be found when computing the virtual cameras. More specifically, referring to FIG. 4, this may involve identifying a feature 140A of the photographic subject in a photo 141, looking for the same feature 1408 in another photo 142, and if it is found, simultaneously estimating the three-dimensional camera positions of the photos and a position of point 140C (an example of a point in the point cloud) such that when the point 140C is re-projected back into the corresponding photo's cameras it re-projects to points 140A, 1408 where the feature is found in the respective photos 141, 142. Details on deriving a point cloud of features and postures of virtual cameras from a photo collection may be found elsewhere.

Referring back to FIG. 2, the photosynthesizer 120 outputs the point cloud and camera poses/postures 122, which are made available to a model renderer/editor 124. The model renderer/editor 124 has one or more software modules for performing a process 126, which may include operations such as: maintaining and rendering a three-dimensional model; using points in the point cloud and/or vanishing points in the photos as constraints for fitting planes of the three-dimensional mesh model; interactively altering the geometry of the model and in particular orienting and translating planes of the model (perhaps as informed by the point clouds, photos, and virtual cameras); displaying photos for the purpose of selecting constraint points in the point cloud; marking the photos to define patches for generating corresponding textures for the model; etc. Details of these operations will be described in detail further below. Finally, the model renderer/editor 124 outputs a mesh model 128 which may also include textures for the model.

As mentioned above, FIG. 3 shows photos 100 and viewpoints of virtual cameras 152 of a real world scene or subject 150. Though not shown, each photo 100 has image data of the subject 150, taken from varying perspectives and distances. As in FIG. 1, the photos might be of a shed or some other building with planar surfaces. The virtual cameras 152 are three-dimensional positions and directions from which the subject 150 was photographed. For clarity, the pyramids in FIG. 3 are shown distant from the subject 150, however, in practice a pyramid would be arranged such a point of its photo 100 would lie on or near a hypothetical reconstruction of the subject 150.

Plane Fitting

Figure 5:
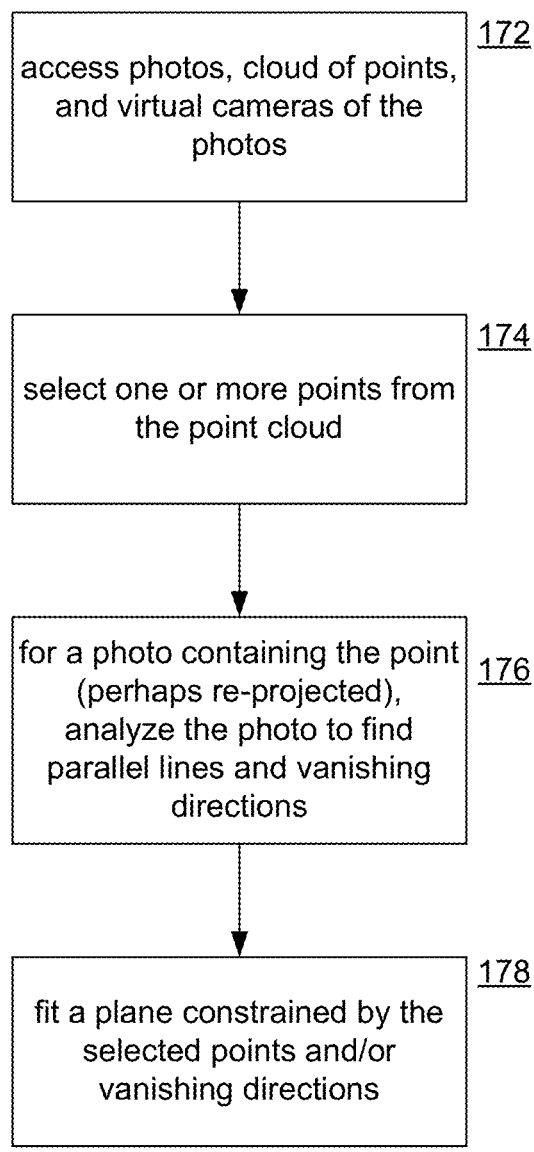
FIG. 5 shows a plane fitting process.

FIG. 5 shows a plane fitting process. The plane fitting process uses the photos 100 and point cloud 122 to constrain a fit of a plane of the three-dimensional model. The process starts by accessing 172 the photos, point cloud, and virtual cameras. One or more points from the point cloud are selected 172. A point may be selected by a variety of means. In one embodiment, one of the photos is displayed in two-dimensions, perhaps including re-projected points that happen to fall on or intersect the photo. A user selects a region of the photo containing re-projected points that the user deems to correspond to the plane that is being defined. The selection may involve a drag operation or interactively sketching a region of interest. A set of points may also be selected 174 automatically, for example, by a process that analyzes a photo for likely locations of a plane (e.g., regions between parallel lines, regions with a same estimated focal depth, etc.). Whether selected automatically or manually, one or more of the points may be selected 174 and used as an initial basis for constraining the plane.

Figure 6:
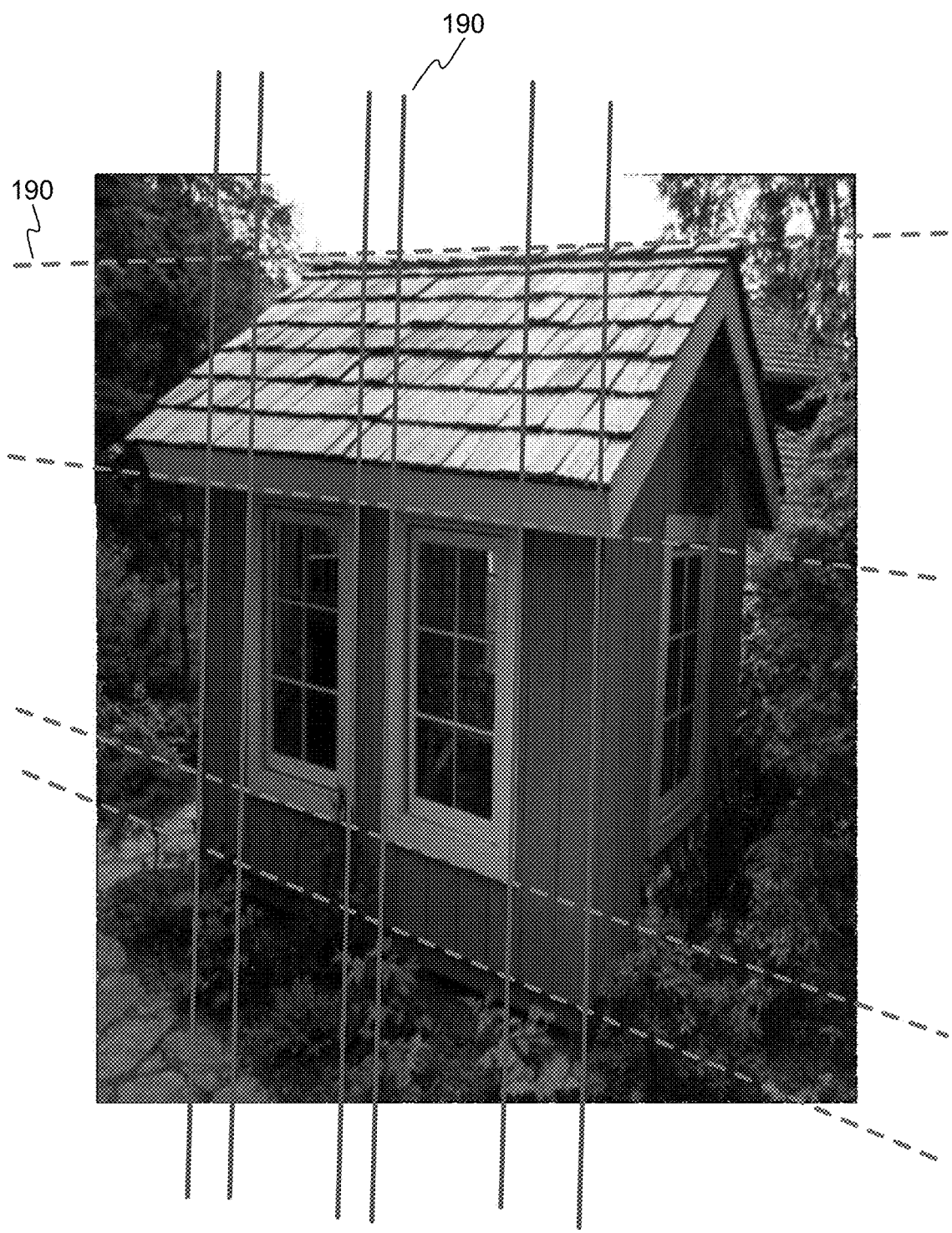
FIG. 6 shows parallel lines identified in a photo.

Next, the photo is analyzed 176 to identify parallel lines and vanishing directions. Note that this analysis 176 may be done in advance during a pre-processing stage during which each image is analyzed to find two-dimensional vanishing points, and from the two-dimensional vanishing points, three-dimensional vanishing directions are found (in a manner similar to that of finding three-dimensional feature points from two-dimensional feature points in the photos). As shown in FIG. 6, known techniques can be used to find lines 190 of a photo's subject/scene that are parallel (as part of the photo's subject/scene) and converge on a vanishing point relative to the photo. Groups of parallel lines 190 may be found by choosing one line and repeatedly comparing it to other lines in the photo, thereby obtaining clusters of parallel lines that converge on respective vanishing points. In FIG. 6, a vertical cluster is shown with solid lines, and a horizontal cluster is shown with dashed lines. The parallel lines in the photo can be used to derive a vanishing direction in three dimensions, a vanishing direction being a three-dimensional direction independent of any three-dimensional location. Note that the photo is three-dimensionally situated according to its virtual camera. Therefore, a photo's three-dimensional orientation (its normal projecting to its virtual camera) can be used to determine the three-dimensional direction of its vanishing point. Furthermore, by the same means, different vanishing directions of other photos may also be computed, thereby giving a set of potential vanishing directions in the locale of the plane that is to be fitted.

Given a vanishing direction and/or a point of the point cloud, a plane is fitted 176 as constrained by the vanishing direction and/or the point. If no other constraints are provided, the plane would ordinarily be constrained with at least one the vanishing direction and two three-dimensional points, or one point and an additional vanishing direction. Additionally or alternatively, two different vanishing directions can be used to completely constrain the orientation of the plane (without using a point in the point cloud). Depending on how many vanishing directions can be recovered for the plane of interest, there may be 1, 2 or 3 degrees of freedom in choosing the optimal plane. Thus the plane fit 176 may involve sampling different orientations for the plane, using 1, 2, or 3 degree-of-freedom solutions. Three random points (of the relevant points in the point cloud) may be used to constrain the plane. One vanishing direction and two points may be used to compute the plane. Or, two vanishing directions and one point may be used to compute the plane. In other embodiments, only one or more points may be used, or only one or more vanishing directions may be used to constrain the fit 176 of the plane.

Regardless of what combination of points and/or vanishing directions are used to compute the plane, different candidate points and/or vanishing directions may be repeatedly tested to search for an optimal plane fit. Candidates can be measured by factors such as the complexity of the resulting model or how well the resulting model matches various of the photos. A photo based evaluation might involve, for example, projecting photos onto the resulting model, computing the average pixel color on the surface, and then evaluating how well that agrees with each image. A feature-based approximation could also be used to evaluate a potential plane fit. The photosynthesizer 120 might generate correspondences between two-dimensional interest points in the images as well as an estimated three-dimensional location for the point. For each candidate plane, there are a number of points associated with it and constrained to lie on the plane. The sum of the re-projection errors of these constrained 3D points can be used to evaluate the correctness of the model according to the candidate plane. This can be implemented by orthogonally projecting the original estimated three-dimensional point onto the plane to get the constrained three-dimensional location or by actually solving for the constrained position that minimizes the re-projection error.

As mentioned, one embodiment may involve fitting 176 a plane based only on one or more vanishing directions. Given some vanishing directions (three-dimensional directions), it can be assumed that the plane being fitted should be parallel to one direction and should be parallel to another direction (the directions possibly coming from different photos per their respective cameras), and then the two vanishing directions will allow computation of the normal of the plane. From there, a depth (location of the plane along the normal) may be estimated using one or more points from the point cloud. The points, perhaps selected interactively from one of the photos, can then be used to snap the plane to a position that one or more points best agree with. Depths of different points can be tested (see the re-construction tests discussed above) to find a preferred constraint point. In one embodiment, the plane depth that gives the most number of agreeing points is chosen; points that agree with that depth are used to perform a least squares optimization to find a final optimal depth.

Plane Adjustment

Figure 7:
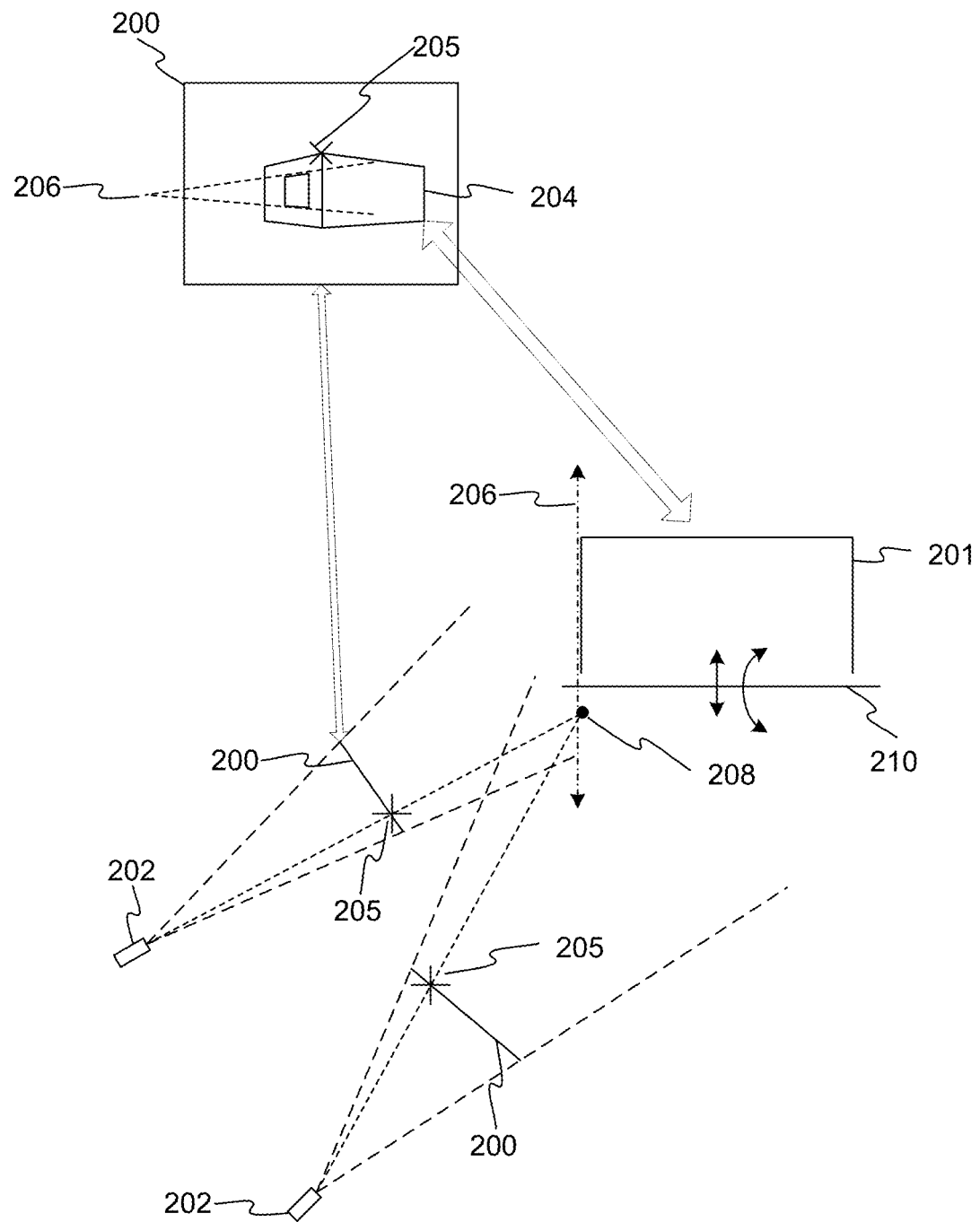
FIG. 7 shows an overhead view of projections of photos onto a three-dimensional model.

Having computed a plane for the model under construction, there may be errors in the orientation or placement of the plane. An embodiment may be provided to allow a user to fine-tune a plane of the model. FIG. 7 shows an overhead view of projections of photos 200 onto a three-dimensional model 201. The projections that be used to facilitate manual manipulation of the geometry of the model, and in particular, the depth (location) and/or orientation of a plane of the model. The discussion of FIG. 8 will cover how the projections of FIG. 7 may be used.

In FIG. 7, two or more photos 200 are oriented in a virtual three-dimensional space according to their respective viewpoints or virtual cameras 202. In a virtual three-dimensional space, the virtual cameras 202 have a position and orientation, and the respective photos 200 are shown according to their focal distance from their virtual cameras 202. The photos contain image data of a real world subject, such as a building 204. As discussed above, a vanishing point 206 (and corresponding vanishing direction) may be computed from a photo 200. In the example of FIG. 7, each photo 200 contains a same feature 205 of the building 204. In this example, the feature 205 is a corner of building 204. A corresponding feature point 208 of a point cloud is also shown. The feature point 208 is a three-dimensional point where features 205 intersect when projected from their respective virtual cameras 202 and photos 200.

FIG. 7 also shows a top-down two-dimensional view of the model 201, which is a simple three-dimensional mesh model for which a plane 210 is being fitted. The model 201 is a model corresponding to the building 204. Note that the vanishing direction 206 is also shown near model 201. Vanishing direction 206 is a three-dimensional direction derived from one of the photo's 200 parallel lines (vanishing point) and oriented according to the photo's virtual camera 202, or equivalently, according to the orientation and placement of the photo in the three-dimensional space. As will be discussed with reference to FIG. 8, the photos 200 can be projected onto the model 201 by computing where pixels of the photos 200, as projected from their virtual cameras 202, fall on the model. Overlap of the projected pixels can be used to help a user align and orient the plane 210. The content of FIG. 7 is only an example, and arbitrary photos 100/200, models 128/201, camera poses 122/cameras 202, and points 122/208 may be used in arbitrary three-dimensional arrangements.

Figure 8:
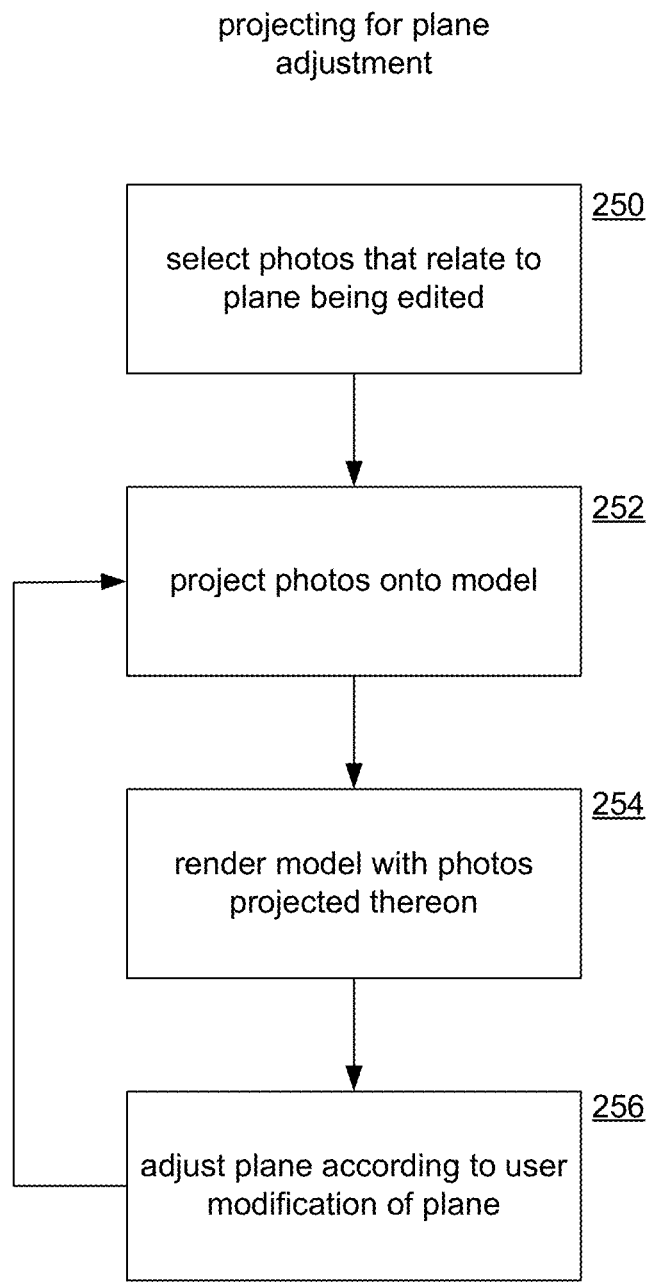
FIG. 8 shows a general process for using projections of photos onto a model to facilitate manual adjustment of a plane.

FIG. 8 shows a general process for using projections of photos 200 onto model 201 to facilitate manual adjustment of plane 208. Initially, photos 200 that relate to the plane are selected 250. This may be done automatically by identifying photos whose projected pyramids intersect plane 210. Selecting 250 may also be done manually, possibly by choosing from among photos that have some minimal projection onto the plane. The selected 250 photos 200 are then projected 252 onto the model 201 and plane 210. Projecting 252 can be conceptually thought of as similar to an optical slide projector projecting a photographic slide (i.e., image 200), with the light of the projector (i.e., camera 202) projecting out as a pyramid and illuminating whatever it hits (model 201) with the projected image of the slide (photo 200). As seen in image 280 of FIG. 9, ghosting occurs when multiple photos 200 are projected onto the model 201 while the plane 210 is not positioned or oriented in close correspondence with its "true" orientation/position (a position/orientation mirroring the corresponding real world plane of real world subject 204). This ghosting effect is a result of parallax; the plane-induced shift of a projected point away from where it would be if the plane were at its true orientation/position.

To explain further, consider a single photo 200 which contains an image of a particular view of the building 204 and a wall that plane 210 represents. The virtual orientation and location of the photo's 200 virtual camera 202 is comparable to the real location and orientation of the actual camera that took the photo 200. If the plane 210 is arranged with a location and orientation that corresponds to the wall it represents, then the projection of the photo 200 will match the plane 210. In other words, the lines and features (e.g. corners, edges, borders) of the wall in photo 200, when projected from its virtual camera 202, will align with fall upon any corresponding lines and features of the plane 210. When the plane 210 is not arranged to match the arrangement of the wall it represents, images of the wall projected onto the plane 210 will create shadows, ghosts, and other artifacts. See FIG. 9, which will be discussed later.

Returning to FIG. 8, the model 201 and plane 210, with the photos 200 projected 252 thereon, are rendered 254 and displayed. The user manually adjusts 256 the plane 210, for example, by using a mouse to adjust the orientation and/or the location of the plane. In particular, the depth of the plane 210 may be adjusted. This involves the user translating the plane 210 along its normal. Furthermore, when adjusting 256 the plane 210, the plane 210 can be automatically snapped to various positions and/or orientations, for example, based on the point cloud or constraints derived from the point cloud. Plane adjustment 256 may also involve revising the border or perimeter 284 of the surface defined by the plane 210.

The projecting 252, rendering 254, and adjusting 256 may be repeated until the user, according to the visual feedback of the rendering 254 and displaying, has finally arranged the plane 210 to minimize the visual artifacts and accurately model the wall that the plane 210 represents. At this point, the user might also select one or more photos for texturing the plane 210.

Figure 9:
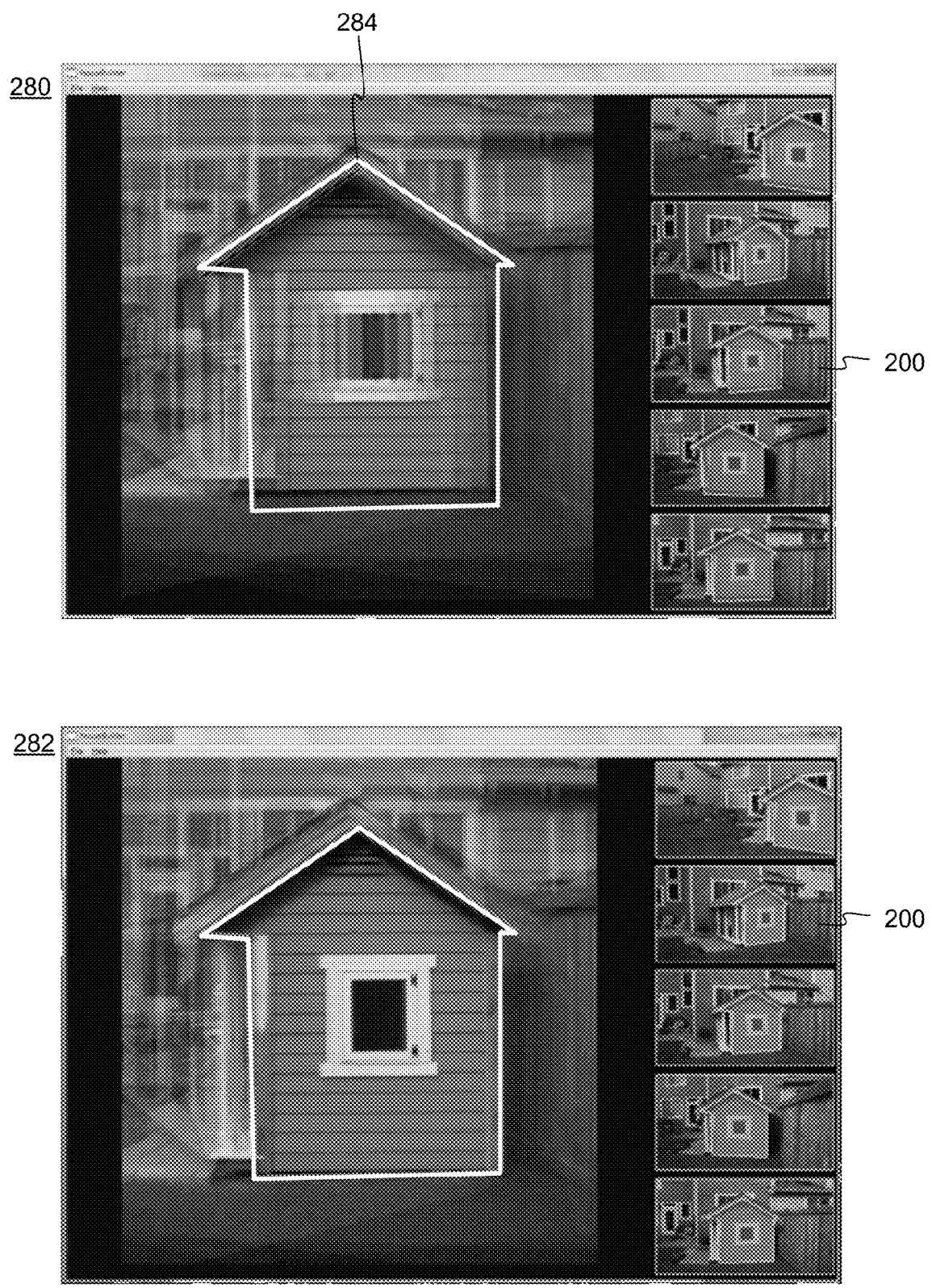
FIG. 9 shows two renderings of a model with photos projected thereon.

FIG. 9 shows two renderings 280, 282 of the model 201 with photos 200 projected 252 thereon. The various photos 200 are shown individually, in two-dimensions, on the right hand side of the renderings 280, 282. In the rendering 280, plane 210 of the model 201 is out of alignment; its depth (or orientation) is incorrect. Consequently, the photos 200 simultaneously projected 252 thereon appear out of focus as a group. As the user adjusts 256 the depth of the plane 210 (or orientation), the parallax of each projected 252 photo 200 is reduced until the displayed rendering 282 shows few collective artifacts on the plane 210. Naturally, due to parallax, projected portions of the photos 200 that are not part of the wall/plane may continue to exhibit artifacts and parallax.

While rendering of photo projections onto a model can reflect the accuracy of the model, other techniques can also be used to provide visual feedback to the user. For example, the plane, textured by the projected photos, can be analyzed for artifacts. Parallax of feature points, such as point 208, as projected onto the model/plane can be measured and used as a basis to provide visual feedback. A graph might be displayed indicating how closely the plane agrees with the relevant points of the point cloud. Furthermore, a user may be provided with means to control which photo(s) are currently projected, thereby enabling fine-tuning the plane to a particular photo.

Texture Generation

Figure 10:
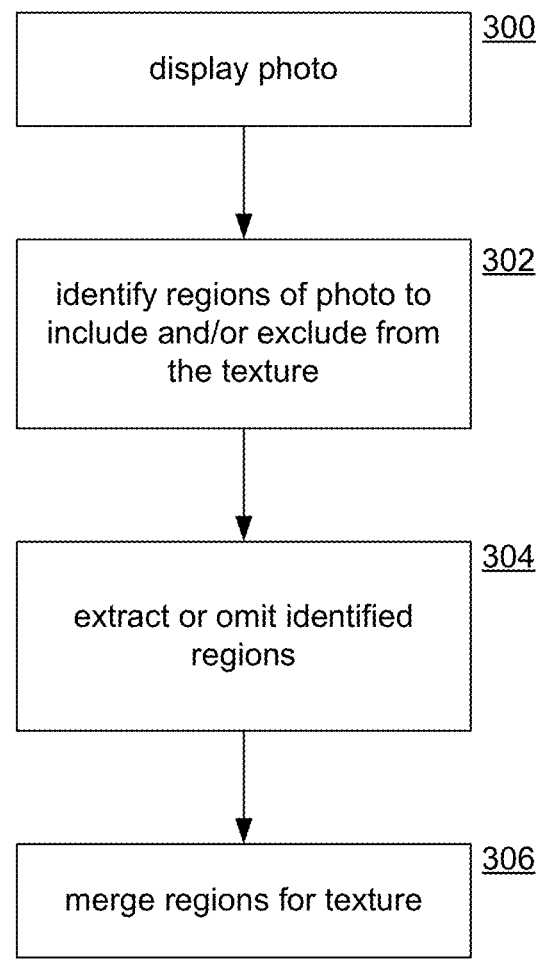
FIG. 10 shows a process for constructing a texture for a model based on multiple photos of the model.

FIG. 10 shows a process for constructing a texture for a model based on multiple photos of the model. While it may be possible for some planes of a model to be textured by only one photo (from among many possible photos), it will often be desirable to create a texture for a plane using different patches or portions from different photos. For example, one photo, from one perspective, may show a left half of a wall unoccluded, while another photo of the wall, due to its different perspective, shows the left half of the wall occluded by a bush or tree, for example. The process of FIG. 10 allows portions of photos to be stitched together to create a texture image for the model.

Figure 11:
FIG. 11 shows photos with strokes identifying portions of the photos that are to be included in or excluded from a texture.
Figure 11:

The process may begin by displaying 300 a photo. The photo may be one of several that correspond to the plane being textured. User input or other information is received that identifies 302 one or more regions to exclude or include in the texture. Referring to FIG. 11, such input might include strokes 320 to identify portions of a photo that are to be included in the texture. The input might also include strokes 322 that mark underlying patches or regions as portions to be omitted from the texture. While some parts of photos may be identified 302 manually, a patch or portion may also be automatically identified 302 for inclusion or exclusion automatically, based, for example, on its image qualities or how well it matches nearby textures of other parts of the model. Some image portions may be automatically identified as occlusions (e.g., trees) using corresponding points of the point cloud. The points may indicate such image portions are not near the relevant plane. Some occlusions might be identified using an image recognition algorithm to recognize types of objects not typically part of a building, for example.

Once various regions of photos have been identified 302 for inclusion/inclusion in the texture, the regions are extracted 304 and merged 306. Any number of known algorithms can be used for generating an image from different regions or patches of photos of a same subject. Such algorithms typically perform color and tone balancing, and may identify seams or other areas where patches may be joined with minimal visual artifacts.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device, including portable devices, workstations, servers, mobile wireless devices, and so on.

The invention claimed is:

1. One or more computer-readable storage media storing information to enable a computing device to perform a process, wherein the computer-readable storage media is not a signal, wherein the process comprises:
    automatically reconstructing geometry of a three-dimensional model in a three-dimensional space from digital photos of a real-world subject that have arrangements relative to each other in three dimensions;
    while displaying a surface of the three-dimensional model that is moving in accordance with a user to interactively reorienting or repositioning the surface relative to the three-dimensional model and relative to a fixed point in the three-dimensional space:
    repeatedly recomputing an intersection of the moving surface with a projection of the digital photo, the projection computed out from the fixed point in the three-dimensional space and toward the reorienting or repositioning surface, wherein as the surface is displayed moving according to the reorienting or repositioning the intersection of the projection and the surface changes accordingly, wherein the digital photo is redisplayed in the intersection as the intersection changes with the reorienting or repositioning of the surface.

2. One or computer-readable storage media according to claim 1, wherein the digital photo comprises one of the digital photos used to reconstruct the geometry of the three-dimensional model.

3. One or more computer-readable storage media according to claim 2, the process further comprising automatically selecting the digital photo from among the digital photos based on a correspondence of the digital photo to the surface.

4. One or more computer-readable storage media according to claim 3, wherein the fixed point comprises a reconstructed position corresponding to a physical position from which the digital photo was captured.

5. One or more computer-readable storage media according to claim 1, wherein the surface comprises a plane, the process further comprising:
    allowing the user to interactively translate the plane in a given direction; and
    repeatedly redisplaying the plane as the user translates the plane.

6. One or more computer-readable storage media according to claim 5, wherein, as the plane translates closer to a position that corresponds to a true position of a physical surface of the real-world subject, features of the displayed digital photo more closely align with features of the plane.

7. One or more computer-readable storage media according to claim 1, the process further comprising automatically selecting the digital photo based on a determination that the projection intersects the surface.

8. A method performed by a computing device, the method comprising:
providing a three-dimensional model, the three-dimensional model corresponding to a real-world subject, wherein the three-dimensional model is in a three-dimensional space and has a surface corresponding to a portion of the three-dimensional model;
displaying a rendering of the three-dimensional model;
given a virtual projection point having a fixed position in the three-dimensional space, computing a pyramidal projection of a digital photo out from the virtual projection point and in a direction toward the surface;
during interactive reorienting or repositioning of the surface relative to the three-dimensional model and relative to the projection:
displaying the surface moving as it is reoriented or repositioned relative to the three-dimensional model and relative to the projection,
automatically repeatedly computing intersections of the projection with the surface as the surface is being reoriented or repositioned relative to the three-dimensional model and the projection, and
repeatedly redisplaying at least a portion of the digital photo in the intersections.

9. A method according to claim 8, the method further comprising receiving user input directed to image data of the digital image to identify a corresponding part of the digital photo to use in a texture for the plane.

10. A method according to claim 8, wherein shape of the three-dimensional model has been at least in part automatically constructed according to a plurality of viewpoints computed from a plurality of respective digital photos of the real-world subject.

11. A method according to claim 10, wherein the viewpoint comprises one of the plurality of viewpoints.

12. A computer implemented method for interactively editing a three-dimensional model, the method comprising:
providing a plurality of viewpoints oriented toward the three-dimensional model and positioned in three dimensions in correspondence to the three-dimensional model, each viewpoint having a corresponding digital photo of a real world scene at least partly corresponding to the three-dimensional model;
computing pyramidal projections from the viewpoints, respectively, each projection oriented toward the three-dimensional model according to its corresponding viewpoint;
repeatedly recomputing intersections of the projections with a surface of the three-dimensional model while the surface of the is being interactively reoriented or repositioned surface relative to the three-dimensional model and while the surface is displayed with movement corresponding to the repositioning or reorienting; and
mapping portions of the digital photos, respectively, to the respective intersections of the projections, and displaying the mapped portions on the surface while the surface is being interactively repositioned or reoriented.

13. A computer implemented method according to claim 12, wherein ghosting due to the mapped portions of the digital photos being concurrently displayed on the surface increases as the surface is oriented or positioned away from an optimal orientation or position, and ghosting decreases as the surface is oriented or positioned toward the optimal orientation or position of the plane.

14. A computer implemented method according to claim 12, further comprising creating a texture image for the surface by merging the portions of the digital photos.

15. A computer implemented method according to claim 14, further comprising identifying one of the portions based on user input directed to a display of a corresponding one of the digital photos.

16. A computer implemented method according to claim 12, wherein two of the digital photos contain image data corresponding to a same feature of the real world scene that is represented by the surface, the process further comprising creating a texture image for the surface by combining different portions of the two digital photos.

17. A computer implemented method according to claim 16, further comprising:
providing a cloud of three-dimensional points that represent features common to groups of digital photos; and
using points of the cloud to identify portions of the digital photos that are to be omitted from the texture image.

* * * * *